April 7, 1931.                J. L. FINCH                  1,799,681
              NEUTRALIZATION OF THE NATURAL CAPACITIVE
                     COUPLING OF ADJACENT CIRCUITS
                         Filed Sept. 8, 1927
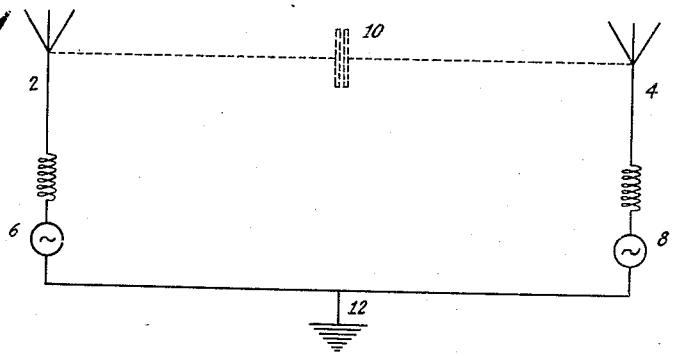
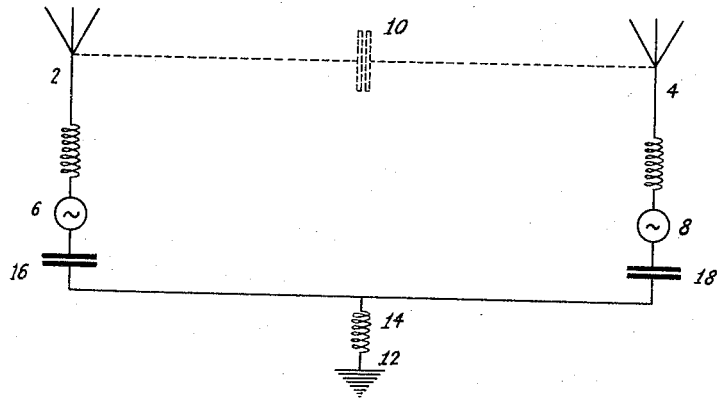
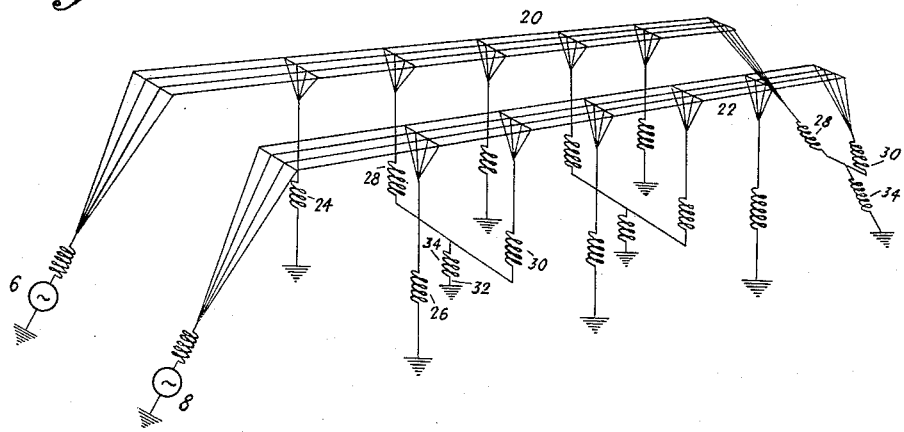
INVENTOR
JAMES L. FINCH.
BY
ATTORNEY Patented Apr. 7, 1931

1,799,681

UNITED STATES PATENT OFFICE

JAMES L. FINCH, OF CRANFORD, NEW JERSEY, ASSIGNOR TO RADIO CORPORATION OF AMERICA, A CORPORATION OF DELAWARE

NEUTRALIZATION OF THE NATURAL CAPACITIVE COUPLING OF ADJACENT CIRCUITS

Application filed September 8, 1927. Serial No. 218,127.

This invention relates to neutralizing the natural capacitive coupling of adjacent circuits, and more particularly the antennæ circuits of a multiplex transmission station.

Various methods have been proposed for so coupling a plurality of antennæ circuits as to oppose the effect of their natural capacitive coupling. These known methods require the use of inductors which are subjected to a high potential, and which therefore present great difficulties in insulation. It is an object of my invention to overcome this, which I do by locating a coupling inductor in the antennæ circuits at such a point that one of the terminals of the inductor is at ground potential.

A further object of my invention is to greatly simplify and cheapen the equipment needed for neutralizing the antennæ, and to this end I have discovered that neutralization of the natural capacitive coupling may be accomplished by that natural inductive coupling is provided when the plurality of antennæ are connected to a common ground connection.

In some cases a simple short ground connection may be insufficient for complete neutralization. With part of the natural capacitance neutralized, to neutralize the remainder by the usual type of inductance connected between the antennæ to resonate with their natural capacitance is sometimes inconvenient, for the reduced capacitance requires increased inductance for resonance. Accordingly it is a further object of my invention to insure that the common ground connection provides sufficient coupling for complete neutralization, which I do by inserting an inductor in the common ground connection.

An extensively used transmitting antenna is the multiple tuned antenna of E. F. W. Alexanderson. If several such antennæ lie parallel to one another their mutual capacitive coupling is greatly increased. It is a more detailed object of my invention to provide for opposing the natural coupling of such antennæ, and this I do in a simple manner by connecting one or more corresponding ground connections of the antennæ to common ground leads, and if necessary these leads may include series coupling inductors.

My invention is described more in detail in the following specification, which is accompanied by a drawing in which Figure 1 represents my invention in simplest form;

Figure 2 shows the use of an inductor in the common ground lead; and

Figure 3 represents the invention as applied to multiple tuned antennæ.

In Figure 1 there are indicated transmitting antennæ 2 and 4, energized by transmitters 6 and 8, and coupled together by the mutual capacitance of the antennæ, represented by the condenser 10. I have found that if the antennæ, instead of being separately grounded, are connected together through a common ground connection, such as that indicated at 12, the natural coupling provided by the common lead 12 in itself provides energy for opposing that transferred by the natural capacitance 10.

In some cases the coupling provided by a short direct ground connection may be insufficient to completely neutralize the effect of the capacitance 10. If it is inconvenient to extend the ground connection the inductance thereof may be conveniently increased in the manner indicated in Figure 2, in which a coupling inductor 14 is provided in the common ground lead 12. If the transmitters 6 and 8 are high frequency alternators it is very desirable that one terminal of the alternators remain at ground potential, for otherwise the insulation may be broken down. The insertion of an inductor, such as 14, tends to raise the potential at the grounded side of the alternators, which disadvantage may be overcome by the insertion of condensers 16 and 18 of proper magnitude to series resonate with the inductance 14, and thereby lower the potential of the grounded alternator terminals to ground potential.

I am aware that it has already been proposed to neutralize antennæ by the use of coupling inductors which are in series with the antennæ, and such arrangements may superficially seem similar to the arrangement which I have indicated in Figure 2, but there are these important differences; first, that with my arrangement one terminal of the inductor is at ground potential, and the maximum potential applied to the inductor is that which is caused by the potential gradient across the inductor itself, which potential may be insulated without undue difficulty, whereas all prior arrangements have suggested the use of coupling inductors which are situated in the antennæ circuits above the transmitters, and which therefore must be arranged for insulation against high potentials, adding to their structural difficulty and expense; and second, that with my arrangement a simple conductively connected inductor may be employed, whereas such prior arrangements as used series inductors had to use magnetic coupling, lest each alternator be short circuited to ground through the other alternator.

In Figure 3 I have indicated how my invention may be applied to closely located multiple tuned antennæ. In that figure the two antennæ 20 and 22 are energized from transmitters 6 and 8, and are tuned by multiple ground connections such as 24 and 26. In accordance with my invention one or more of these ground connections may be connected together and grounded through a common ground lead in order to provide coupling in opposition to the natural capacitive coupling of the antennæ. In the particular case illustrated there are six antennæ sections, and of the six tuning points alternate ones, such as 28 and 30, have been connected together and to ground through a common ground lead 32. As was before explained, this common ground lead may be increased in inductance by the insertion of a series inductor 34. In this case there is no necessity to employ series condensers, such as the condensers 16 and 18 in Figure 2, for it is not essential that the lower terminals of the tuning inductors be at ground potential. They are, of course, removed from ground potential only by the amount of the potential drop across the coupling inductor 34.

In the foregoing specification I have spoken of the coupling inductors as neutralizing the natural capacitive coupling of the antennæ. It will be appreciated by those skilled in this art that such neutralization can only be made perfect at one frequency. Inasmuch as the multiplex channels transmit at different frequencies it follows that there can be perfect neutralization only in one direction, the choice of which is optional. In practice it is customary to neutralize for a frequency intermediate the working frequencies, which is more satisfactory than might be predicted, because it is found in practice, and can be shown theoretically, that such neutralization causes that energy which is transferred from each antenna to the other of the antennæ to be in proper phase relation to aid the total radiation. For these reasons I intend the claims which follow to include the cases where the neutralization is at any desired frequency, including the lower and higher transmission frequencies, as well as intermediate frequencies.

I claim:

1. In combination, two grounded circuits having natural capacitive coupling, and means for grounding the circuits and for coupling the circuits in opposition to their natural coupling comprising a common ground lead of sufficient length that the inductance of the common lead serves to appreciably oppose the natural capacitive coupling.

2. A multiplex radiating system comprising a plurality of antennæ, a plurality of transmitters, one coupled to each of said antennæ, an inductor for coupling the antennæ in opposition to their natural coupling, means connecting one end of said inductor directly to ground, and means connecting the other end of said inductor to the antennæ.

3. A multiplex radiating system comprising a plurality of antennæ, a plurality of transmitters, one coupled to each of said antennæ, and a common ground connection for the antennæ of sufficient length that the inductance of the common lead serves to appreciably oppose the natural capacitive coupling.

4. A multiplex radiating system comprising a plurality of antennæ, a plurality of transmitters, one coupled to each of said antennæ, a common ground connection for the antennæ, and an inductor inserted in series in the common ground connection of sufficient inductance, together with the ground connection, to neutralize the natural coupling between the antennæ.

5. A multiplex radiating system comprising a plurality of multiple tuned antennæ, a plurality of transmitters, one coupled to each of said antennæ, and a plurality of common ground connections for the antennæ of sufficient length that the inductance of the common lead serves to appreciably oppose the natural capacitive coupling of the antennæ.

6. A multiplex radiating system comprising a plurality of multiple tuned antennæ, a plurality of transmitters, one coupled to each of said antennæ, a plurality of common ground connections for the antennæ, and an inductor inserted in series in each of the common ground connections, said inductors having sufficient inductance together with the ground connection, to neutralize the natural coupling between the antennæ.

7. In a system for transmitting or conveying intelligence from one geographically situated point to another geographically situated point by the utilization of propagated electromagnetic waves derived from the flow of high frequency undulatory electrical currents operated upon in accordance with the intelligence to be transmitted from the one geographically situated point to the other, the combination of two grounded circuits having natural capacitive coupling, and means grounding the two circuits and for coupling the circuits in opposition to their natural capacitive coupling comprising a connection having an inductive value to appreciably oppose the effects produced by the natural capacitive coupling between the two grounded circuits of the system.

JAMES L. FINCH.